US012749858B2

(12) United States Patent
Anma et al.

(10) Patent No.: US 12,749,858 B2
(45) Date of Patent: Sep. 29, 2026

(54) CONNECTOR

(71) Applicant: Yazaki Corporation, Tokyo (JP)

(72) Inventors: Hikaru Anma, Shizuoka (JP); Yoshimi Wada, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 338 days.

(21) Appl. No.: 18/608,277

(22) Filed: Mar. 18, 2024

(65) Prior Publication Data

US 2024/0347981 A1 Oct. 17, 2024

(30) Foreign Application Priority Data

Apr. 17, 2023 (JP) ................................ 2023-067054

(51) Int. Cl.
*H01R 13/6591* (2011.01)
*H01R 12/71* (2011.01)

(52) U.S. Cl.
CPC ....... *H01R 13/6591* (2013.01); *H01R 12/716* (2013.01)

(58) Field of Classification Search
CPC ............ H01R 13/6591; H01R 13/6596; H01R 12/716
USPC ....................................... 439/607.01, 607.28
See application file for complete search history.

(56) References Cited

U.S. PATENT DOCUMENTS

| | | | | |
|---|---|---|---|---|
| 7,727,018 B2 * | 6/2010 | Bright | H01R 13/6584 | 439/607.28 |
| 7,901,221 B1 * | 3/2011 | Li | H01R 13/6582 | 439/95 |
| 8,672,710 B2 * | 3/2014 | Feldstein | H01R 13/6596 | 439/607.28 |
| 8,854,835 B2 * | 10/2014 | Feldstein | H01R 12/724 | 174/355 |
| 2013/0052867 A1 * | 2/2013 | Li | H01R 13/659 | 439/620.01 |
| 2015/0311644 A1 * | 10/2015 | Yang | H01R 13/745 | 439/607.28 |
| 2019/0252835 A1 | 8/2019 | Hosoyamada et al. | | |
| 2024/0322467 A1 | 9/2024 | Suzuki et al. | | |

FOREIGN PATENT DOCUMENTS

| | | |
|---|---|---|
| JP | 2001-135401 A | 5/2001 |
| JP | 7112062 B2 | 8/2022 |
| JP | 2023-17423 A | 2/2023 |

* cited by examiner

*Primary Examiner* — Gary F Paumen
(74) *Attorney, Agent, or Firm* — Sughrue Mion, PLLC

(57) ABSTRACT

A connector includes: a shield member; a housing to which the shield member is assembled; and a grounding member configured to ground the shield member. The grounding member includes: a main body having a planar shape; and a contact portion formed of a single member continuous with the main body in an elastically deformable manner and configured to contact a grounding object. The shield member includes an engagement portion configured to engage with the main body and hold the grounding member in the shield member.

4 Claims, 8 Drawing Sheets

CONNECTOR

CROSS-REFERENCE TO RELATED APPLICATIONS

The present application is based on and claims the benefit of priority from the prior Japanese Patent Application No. 2023-067054, filed on Apr. 17, 2023, the entire contents of which are incorporated by reference herein.

TECHNICAL FIELD

The present disclosure relates to a connector.

BACKGROUND

Japanese Patent No. 7112062 discloses a connector including a shield member, an outer housing as a housing to which the shield member is assembled, and a grounding spring member as a grounding member for grounding the shield member. The grounding spring member has a main body formed to have a planar shape, a leaf spring formed of a single member continuous with the main body in an elastically deformable manner, and a contact spring arranged in the main body in an elastically deformable manner.

The grounding spring member is held by the outer housing by press-fitting the main body thereof into the outer housing. The grounding spring member held by the outer housing is electrically connected to the shield member by elastically contacting the contact spring thereof with the shield member. The shield member is grounded via the grounding spring member due to an external grounding object elastically contacting the leaf spring of the grounding spring member electrically connected to the shield member.

SUMMARY OF THE INVENTION

Two elastically deformable parts, that are the leaf spring in contact with the grounding object and the contact spring in contact with the shield member, are arranged in the planar-shaped main body of the grounding member in the connector. In this kind of grounding member, when the two elastically deformable parts are elastically deformed, stresses are concentrated at proximal ends of the main body. Therefore, in order to withstand two stress concentrations, it is necessary to increase the size and strength of the main body of the grounding member by increasing the thickness. However, when the grounding member is increased in size, the size of the connector increases. In addition, if there are many elastically deformable parts, plastic deformation may occur in the main body due to stress concentration, and electrical connection reliability may be degraded.

The present disclosure is directed to a connector capable of suppressing an increase in the size and maintaining electrical connection reliability of a grounding member.

A connector in accordance with some embodiments includes: a shield member; a housing to which the shield member is assembled; and a grounding member configured to ground the shield member. The grounding member includes: a main body having a planar shape; and a contact portion formed of a single member continuous with the main body in an elastically deformable manner and configured to contact a grounding object. The shield member includes an engagement portion configured to engage with the main body and hold the grounding member in the shield member.

According to the above configuration, in the connector, an increase in the size can be suppressed and the electrical connection reliability of the grounding member can be maintained.

DETAILED DESCRIPTION OF THE INVENTION

Figure 1:
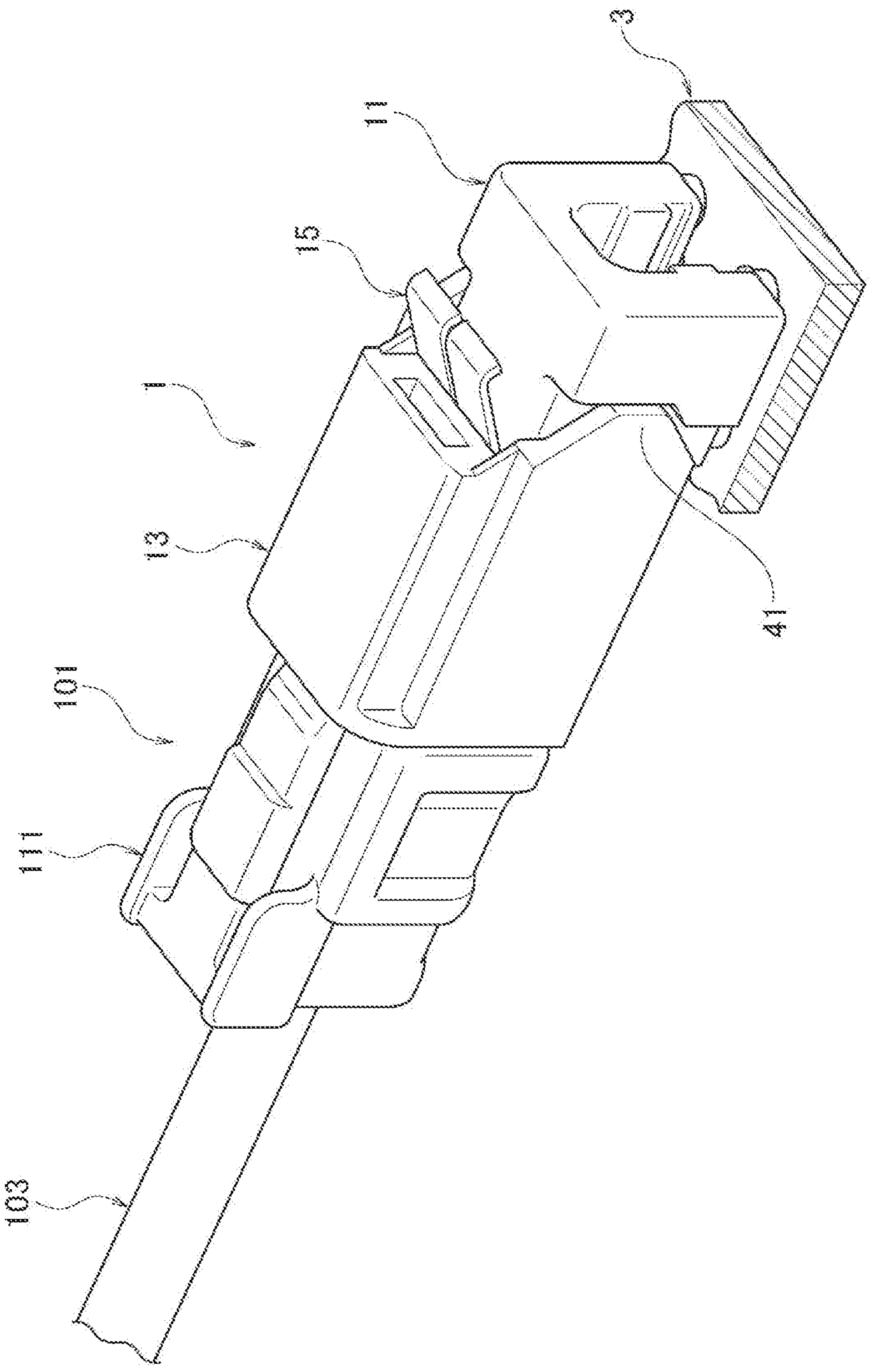
FIG. 1 is a perspective view of a connector according to an embodiment of the present invention when the connector is fitted to a mating connector.

Hereafter, a connector 1 according to an embodiment will be described in detail with reference to the drawings. Note that the dimensional ratios in the drawings are exaggerated for illustrative purposes and may differ from the actual ratios.

As illustrated in FIG. 1, the connector 1 according to the present embodiment is applied to a substrate 3 on which a circuit is formed and is electrically connected to the substrate 3, for example. The connector 1 can be fitted to a mating connector 101 which is electrically connected to a device or the like, for example. The substrate 3 and the device are electrically connected due to the connector 1 being fitted to the mating connector 101.

Figure 2:
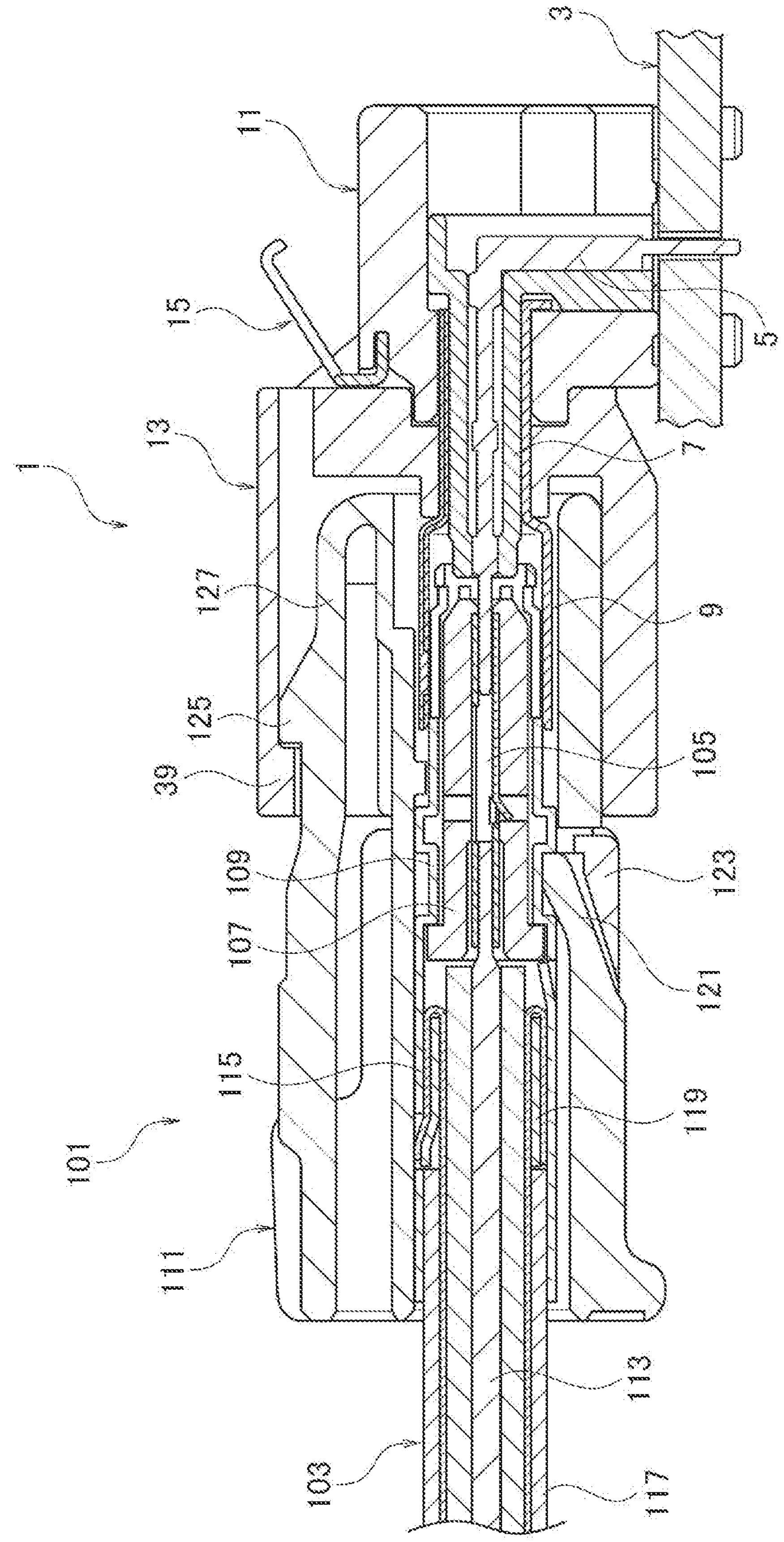
FIG. 2 is a cross-sectional view of the connector according to the present embodiment when the connector is fitted to the mating connector.

As illustrated in FIGS. 1 and 2, the mating connector 101 includes a mating inner terminal 105, a mating inner housing 107, a mating outer terminal 109, and a mating outer housing 111, which are arranged at a terminal part of a shield wire 103.

The shield wire 103 has an electric wire 113, a shield 115, and a sheath 117. The electric wire 113 has a core wire which is constituted by a plurality of twisted element wires made of conductive materials, and an insulating coating which is made of an insulating material and covers the outer periphery of the core wire. The shield 115 is constituted by braiding which is formed by braiding a plurality of element wires made of conductive materials, and is arranged to cover the outer periphery of the electric wire 113. The shield 115 may be constituted not only by the braiding but also by a metal foil or the like. The sheath 117 is made of an insulating material and is arranged to cover the outer periphery of the shield 115.

At the terminal part of the shield wire 103, first a prescribed length of sheath 117 is peeled off. Next, an annular metal sleeve 119 is arranged at the outer periphery of the exposed shield 115. Next, the shield 115 exposed from the metal sleeve 119 is bent toward the sheath 117 so as to cover the metal sleeve 119. Next, a prescribed length of insulating coating of the exposed electric wire 113 is peeled off, and the core wire of the electric wire 113 is exposed. The mating inner terminal 105 is electrically connected to the exposed core wire of the electric wire 113 of the shield wire 103 subjected to a terminal treatment, and the mating outer terminal 109 is electrically connected to the exposed shield 115.

The mating inner terminal 105 is made of a conductive material and includes a female terminal having a cylindrical mating connection portion. The mating inner terminal 105 is electrically connected to the electric wire 113 by crimping a crimping portion constituted by a press-fastening piece to the core wire of the electric wire 113. The mating inner terminal 105 includes an elastically deformable locking lance. The mating inner housing 107 houses the mating inner terminal 105 electrically connected to the electric wire 113 of the shield wire 103.

The mating inner housing 107 is made of an insulating material such as synthetic resin. The mating inner housing 107 is formed into a cylindrical shape so as to be able to house the mating inner terminal 105, and includes therein a hole portion to which the locking lance of the mating inner terminal 105 is engaged. By engaging the locking lance with the hole portion, the mating inner terminal 105 is held by the mating inner housing 107. The mating inner housing 107 is housed in the mating outer terminal 109 and maintains insulation between the mating inner terminal 105 and the mating outer terminal 109.

The mating outer terminal 109 is made of a conductive material. The mating outer terminal 109 is formed into a cylindrical shape so as to be able to house the mating inner housing 107. Engagement portions (not illustrated) are arranged between the mating outer terminal 109 and the mating inner housing 107 to engage with each other, and the mating inner housing 107 is held by the mating outer terminal 109 due to the engagement by the engagement portion. The mating outer terminal 109 is electrically connected to the shield 115 by crimping a crimping portion constituted by a press-fastening piece to the exposed shield 115 of the shield wire 103.

The mating outer housing 111 is made of an insulating material such as synthetic resin. The mating outer housing 111 is formed into a housing shape so as to be able to house the mating outer terminal 109. The mating outer housing 111 has therein an elastically deformable locking lance which is engaged with the mating outer terminal 109. The mating outer terminal 109 is held by the mating outer housing 111 by engaging with the locking lance 121. At a lower part of the mating outer housing 111, a spacer 123 capable of engaging with the mating outer terminal 109 is assembled. By engaging the spacer 123 with the mating outer terminal 109, the mating outer terminal 109 is doubly held by the mating outer housing 111. When the mating outer terminal 109 is housed in the mating outer housing 111, the shield wire 103 is drawn out of the mating outer housing 111.

The mating outer housing 111 can be fitted to an outer housing 13 of the connector 1. An elastically deformable lock arm 127 having a lock 125 is arranged at an upper part of the mating outer housing 111. When the mating outer housing 111 and the outer housing 13 are fitted, the lock 125 of the lock arm 127 is engaged with a locked portion 39 of the outer housing 13. By engaging the lock 125 with the locked portion 39, the mating connector 101 and the connector 1 are held in a fitted state. Fitting between the mating connector 101 and the connector 1 can be released by elastically deforming the lock arm 127 and releasing the engagement between the lock 125 and the locked portion 39.

As illustrated in FIGS. 1 to 9, the connector 1 is mounted on the substrate 3 on which a circuit is formed and is electrically connected to the substrate 3. The connector 1 includes an inner terminal 5, an inner housing 7, an outer terminal 9, a shield member 11, an outer housing 13 as a housing, and a grounding member 15.

Figure 3:
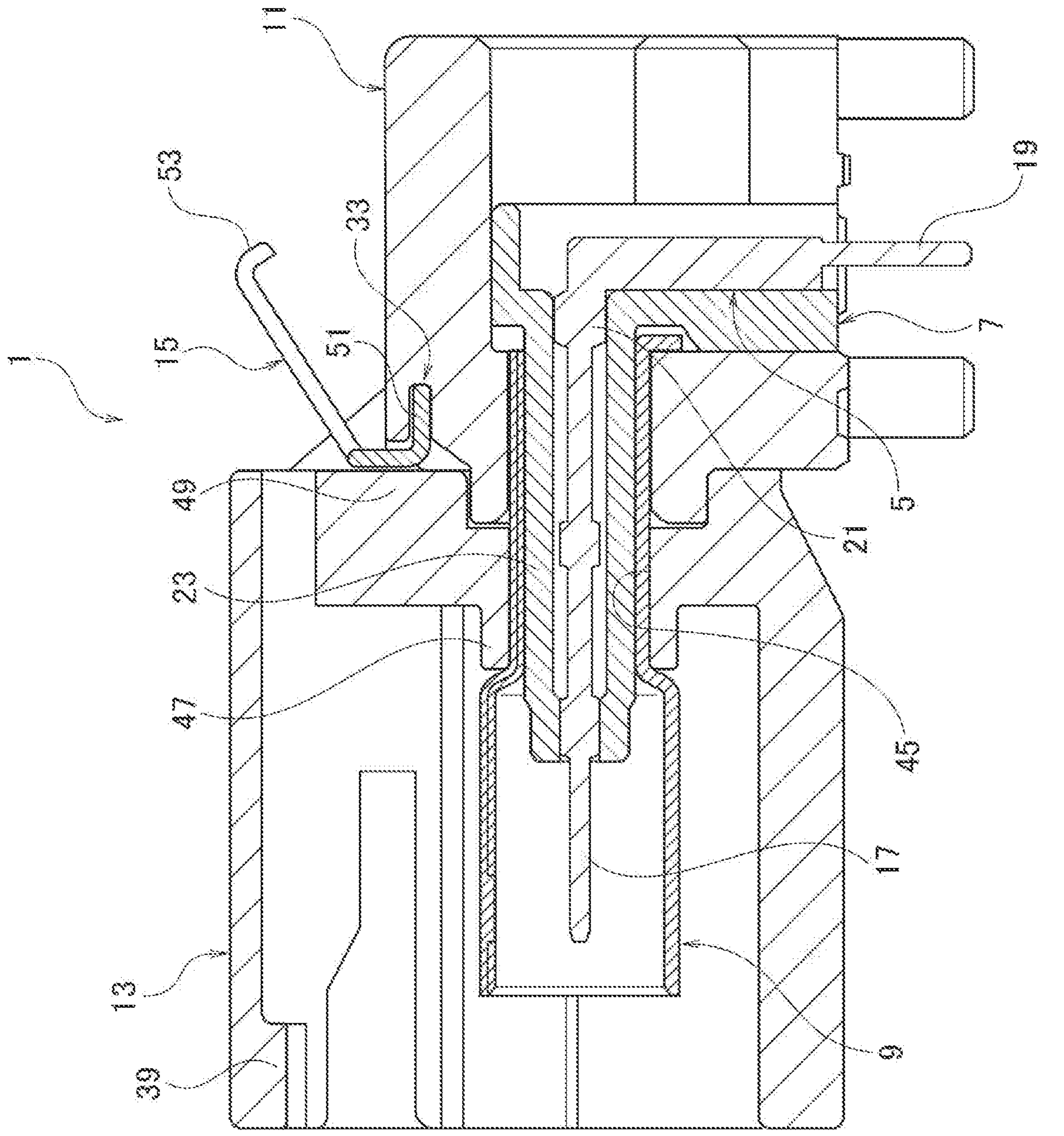
FIG. 3 is a cross-sectional view of the connector according to the present embodiment.
Figure 4:
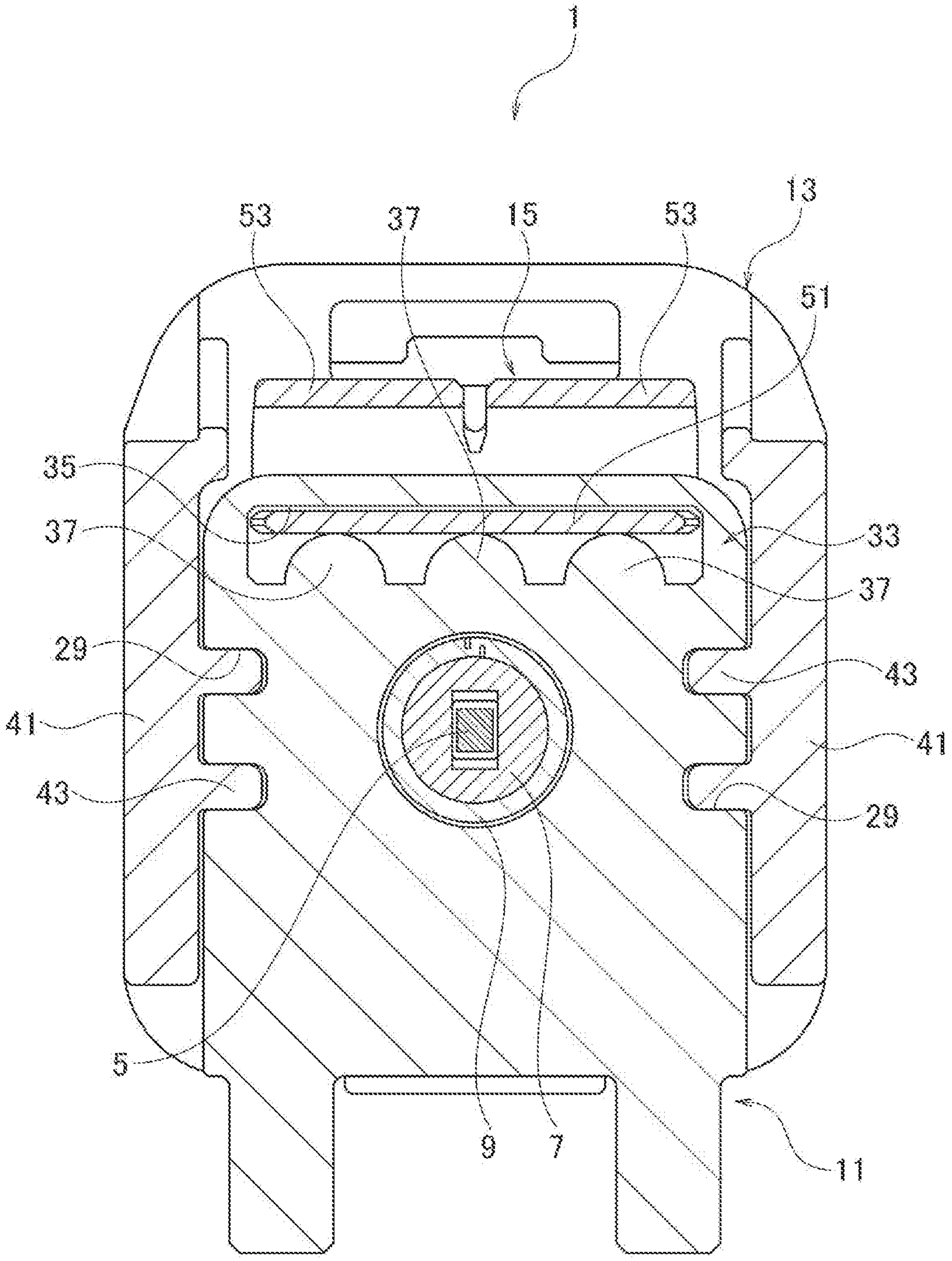
FIG. 4 is a cross-sectional view of the connector according to the present embodiment.
Figure 5:
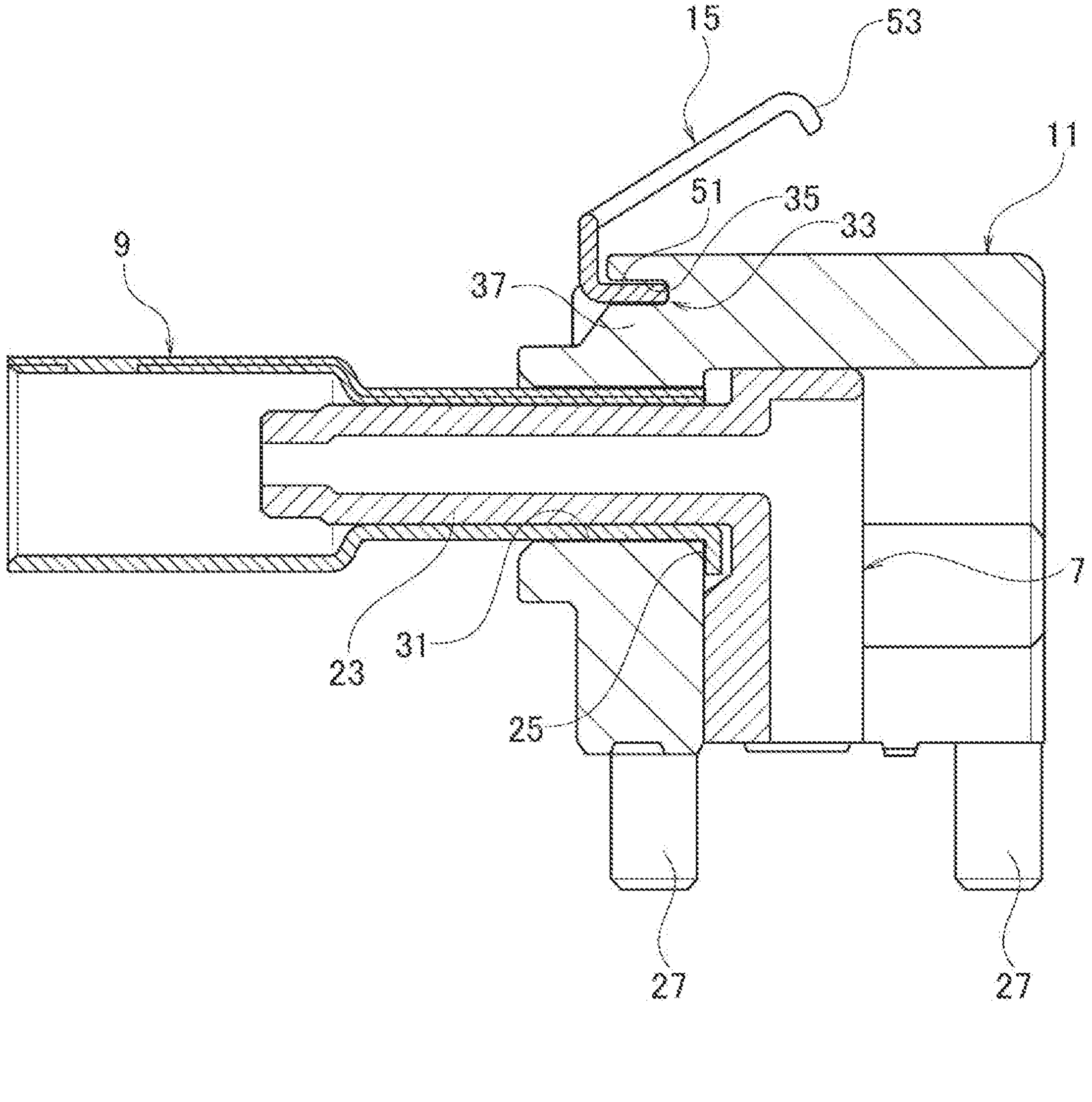
FIG. 5 is a cross-sectional view of an inner housing, an outer terminal, a shield member, and a grounding member of the connector according to the present embodiment.
Figure 6:
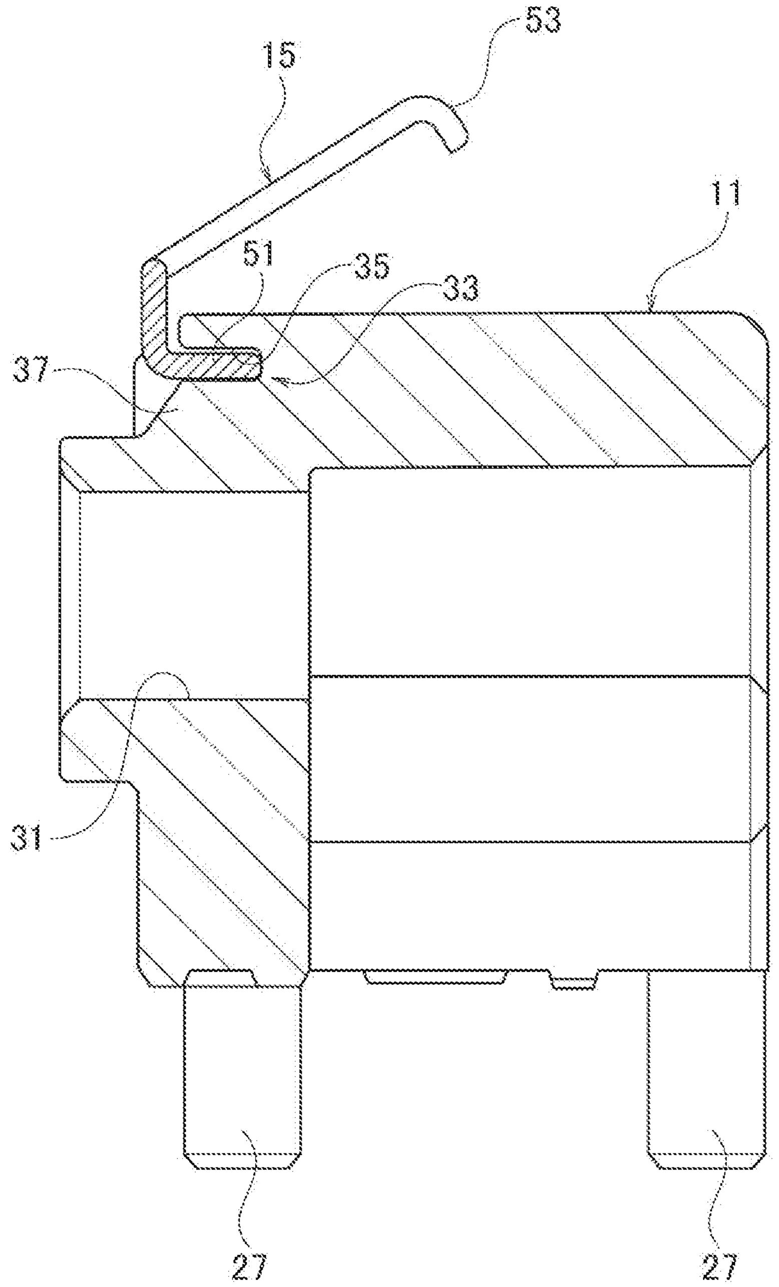
FIG. 6 is a cross-sectional view of the shield member and the grounding member of the connector according to the present embodiment.
Figure 7:
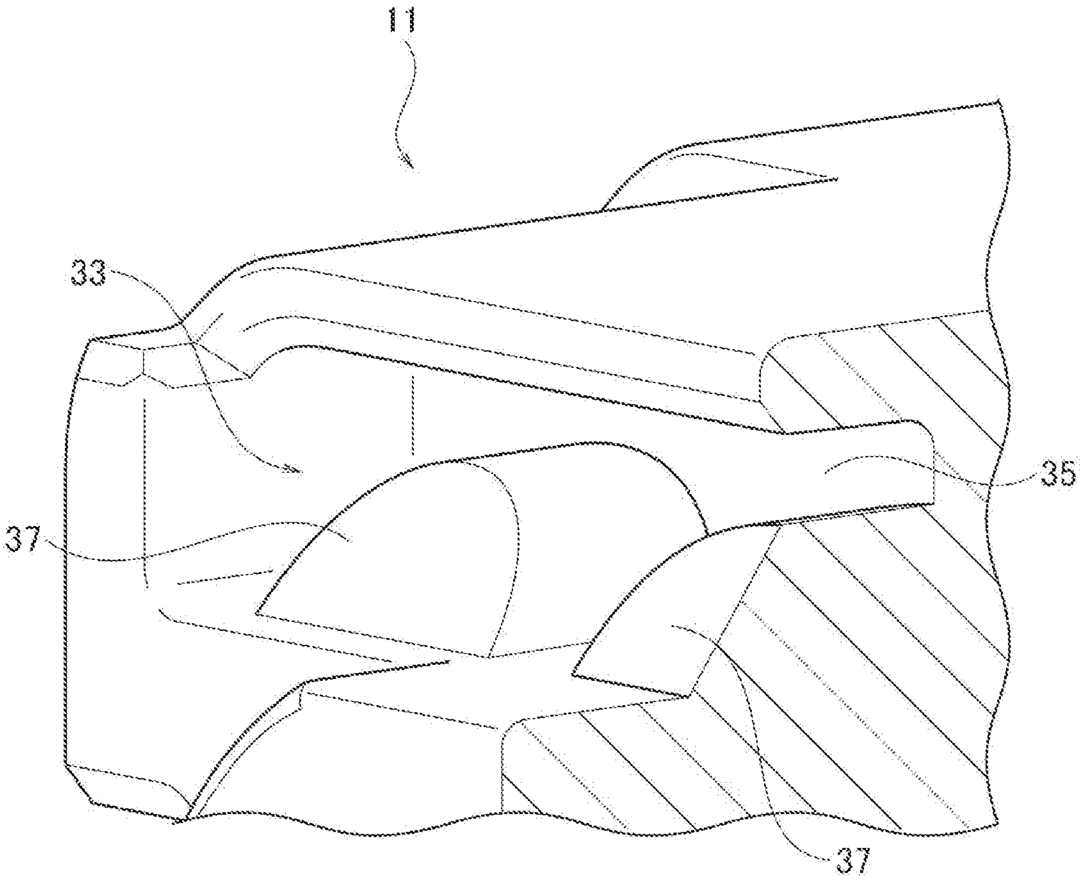
FIG. 7 is an enlarged partial perspective view illustrating a part of the shield member of the connector according to the present embodiment as a cross section.
Figure 8:
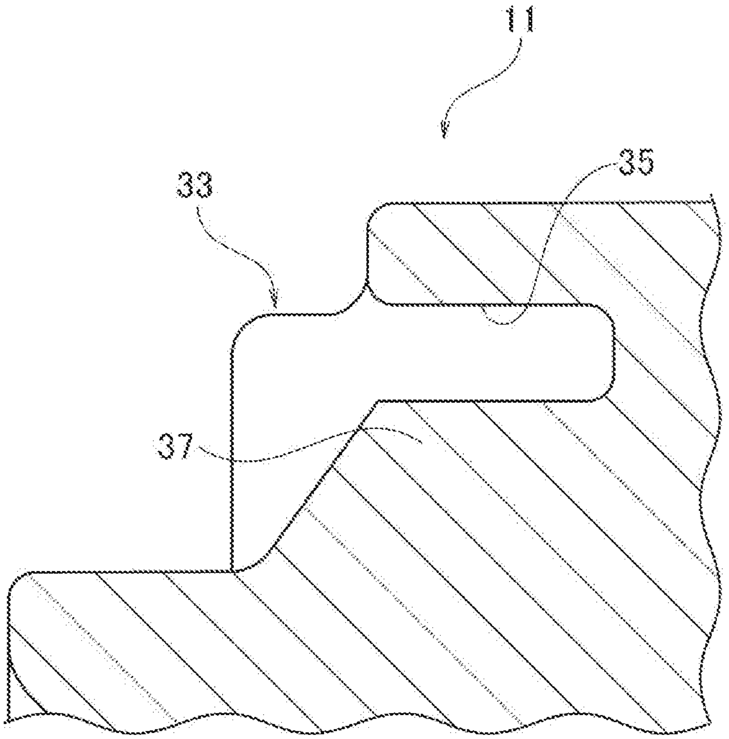
FIG. 8 is an enlarged partial cross-sectional view of the shield member of the connector according to the present embodiment.
Figure 9:
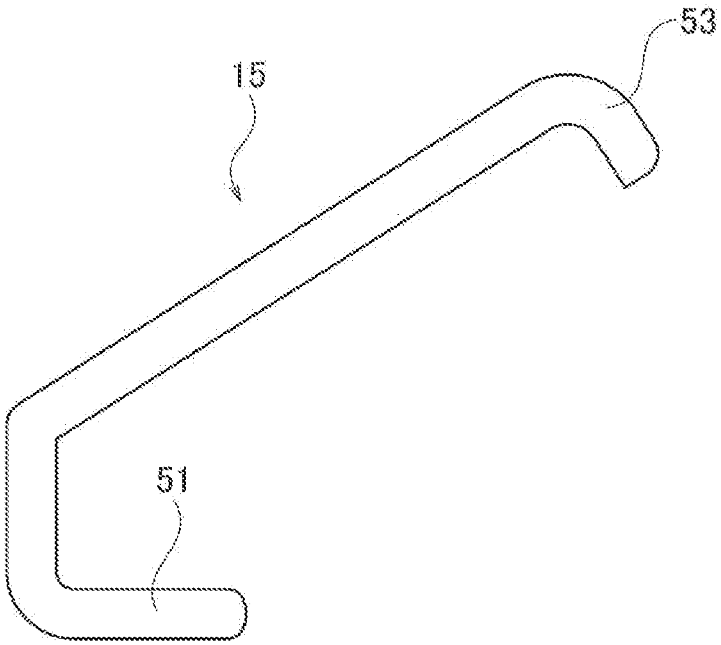
FIG. 9 is a side view of the grounding member of the connector according to the present embodiment.

As illustrated in FIGS. 2 to 4, the inner terminal 5 is made of a conductive material and is arranged on the substrate 3. The inner terminal 5 is formed into an L-shape and has an inner connection portion 17, a substrate connection portion 19, and a press-fit portion 21.

The inner connection portion 17 extends along a plane direction of the substrate 3 to have a rod shape. An extension direction of the inner connection portion 17 is parallel to a fitting direction of the mating connector 101 and the connector 1. With the mating connector 101 and the connector 1 fitted, the inner connection portion 17 is inserted into a hole in the mating inner housing 107 and is fitted to the cylindrical mating connection portion of the mating inner terminal 105 so as to be inserted into the mating connection portion. By fitting the mating connection portion and the inner connection portion 17, the mating inner terminal 105 and the inner terminal 5 are electrically connected. When the mating inner terminal 105 and the inner terminal 5 are electrically connected, the device electrically connected to the mating connector 101 and the substrate 3 electrically connected to the connector 1 are electrically connected.

The substrate connection portion 19 is formed of a single member continuous with the inner connection portion 17. The substrate connection portion 19 extends vertically toward the substrate 3 by bending an end of the inner connection portion 17 toward the substrate 3. The substrate connection portion 19 is electrically connected to a conductive pattern of a circuit formed on the substrate 3 by means of soldering or the like, and accordingly the inner terminal 5 is electrically connected to the substrate 3.

The press-fit portion 21 is formed of a single member continuous with the inner connection portion 17 on the substrate connection portion 19 side of the inner connection portion 17. The press-fit portion 21 is a projection projecting outwardly from both side surfaces of the inner connection portion 17 in a width direction. The press-fit portion 21 is press-fitted against an inner surface of the inner housing 7, and the inner terminal 5 is fixed and held by the inner housing 7.

As illustrated in FIGS. 2 to 5, the inner housing 7 is made of an insulating material such as synthetic resin. A part of the inner housing 7 in which the inner connection portion 17 and the press-fit portion 21 of the inner terminal 5 are housed is a cylindrical portion 23 which is formed into a cylindrical shape so as to expose a part of the inner connection portion 17 which is inserted into the mating connection portion. A part of the inner housing 7 in which the substrate connection portion 19 of the inner terminal 5 is housed is formed into a housing shape so as to cover areas of the substrate connection portion 19 other than an outer surface of the substrate connection portion 19 opposite to the inner connection portion 17. The inner housing 7 houses the inner connection portion 17 of the inner terminal 5 from an opening of the housing shape part toward the cylindrical portion 23. At this time, the press-fit portion 21 of the inner terminal 5 is press-fitted against an inner surface of the cylindrical portion 23, and the inner terminal 5 is held by the inner housing 7. The cylindrical portion 23 of the inner housing 7 is housed in the outer terminal 9, and a part of the cylindrical portion 23 and the housing shape part are housed in the shield member 11. The inner housing 7 maintains insulation between the inner terminal 5 located inside, and the outer terminal 9 and the shield member 11 located outside.

As illustrated in FIGS. 2 to 5, the outer terminal 9 is made of a conductive material. The outer terminal 9 is formed into a cylindrical shape so as to be able to fit to the mating outer terminal 109 therein. On a side of the outer terminal 9 opposite to the mating outer terminal 109, the cylindrical portion 23 of the inner housing 7 is housed. An engagement portion (not illustrated) is arranged between the outer terminal 9 and the inner housing 7 to make the outer terminal 9 engage with the inner housing 7, and the inner housing 7 is held by the outer terminal 9 due to the engagement by the engagement portion. An extension direction of the outer terminal 9 is parallel to the fitting direction of the mating connector 101 and the connector 1. When the mating connector 101 and the connector 1 are fitted, the outer terminal 9 is fitted to the mating outer terminal 109 and is electrically connected to the mating outer terminal 109. When the mating outer terminal 109 and the outer terminal 9 are electrically connected, a shield circuit is formed. By forming the shield circuit, it is possible to prevent intrusion of noise or the like into the mating inner terminal 105 and the inner terminal 5 and leakage of noise or the like from the mating inner terminal 105 and the inner terminal 5. A locking portion 25 engaged with the shield member 11 is arranged on the inner housing 7 side of the outer terminal 9.

As illustrated in FIGS. 1 to 8, the shield member 11 is made of a conductive material and is arranged on the substrate 3. The shield member 11 is formed into a housing shape so as to be able to house the inner housing 7 therein. The opposite side of the outer housing 13 and the substrate 3 side of the shield member 11 are opened. On the substrate 3 side of the shield member 11, a plurality of fixing portions 27 (four in this case) are arranged which are fixed to holes in the substrate 3 by means of press-fitting or the like and protrude toward the substrate 3. By fixing the fixing portions 27 to the substrate 3, the shield member 11 is fixed to the substrate 3. A plurality of press-fit grooves 29 (two in this case) are arranged in outer surfaces of both side walls of the shield member 11 in the width direction. Each press-fit groove 29 extends along the fitting direction of the mating connector 101 and the connector 1. In the fitting direction of the connector 1 relative to the mating connector 101, a front side in the fitting direction of each press-fit groove 29 is opened and a rear side in the fitting direction of each press-fit groove 29 is closed.

The shield member 11 includes a hole portion 31 through which the cylindrical portion 23 of the inner housing 7 and the outer terminal 9 are inserted. When the outer terminal 9 is inserted into the hole portion 31, a part of the outer terminal 9 fitted to the mating outer terminal 109 is exposed to the outside of the shield member 11. An inner surface of the hole portion 31 is in contact with an outer surface of the outer terminal 9. This electrically connects the shield member 11 and the outer terminal 9. The locking portion 25 of the outer terminal 9 is engaged with an opening edge of the hole portion 31 on an inner side of the shield member 11. After the outer terminal 9 is inserted into the hole portion 31, the locking portion 25 is bent so as to be engaged with the opening edge of the hole portion 31. By engaging the locking portion 25 with the opening edge of the hole portion 31, the outer terminal 9 is held by the shield member 11.

An engagement portion 33 is arranged above the shield member 11. The engagement portion 33 has a groove 35 and press-fit projections 37. In the fitting direction of the connector 1 relative to the mating connector 101, the groove 35 is formed such that a front side in the fitting direction is an opening and a rear side in the fitting direction is a bottom. The groove 35 is continuously formed along the width direction of the shield member 11, between both side walls of the shield member 11 in the width direction. Therefore, the groove 35 is formed such that an outer surface of the shield member 11 is recessed in a rectangular shape. The press-fit projections 37 project upward from a lower surface of the shield member 11 in the height direction in the groove 35. In the groove 35, a plurality of press-fit projections 37 (three in this case) are arranged in line in the width direction of the shield member 11. The outer housing 13 is assembled to the shield member 11 arranged with this kind of engagement portion 33.

As illustrated in FIGS. 1 to 4, the outer housing 13 is made of an insulating material such as synthetic resin. The outer housing 13 is formed into a housing shape so as to be able to be fitted to the mating outer housing 111 therein. At an upper part in the outer housing 13, the locked portion 39 is arranged, which can engage with the lock 125 of the lock arm 127 of the mating outer housing 111. At both side walls on the shield member 11 side of the outer housing 13 in the width direction, assembling portions 41 extending toward the shield member 11 side are arranged. On the inner surfaces of the assembling portions 41, a plurality of ribs 43 (two in this case) are arranged which extend along the fitting direction of the mating connector 101 and the connector 1 and project toward the inside. Each rib 43 is press-fitted into each press-fit groove 29 by being inserted into each press-fit groove 29 of the shield member 11 along the fitting direction of the mating connector 101 and the connector 1. By press-fitting each rib 43 into each press-fit groove 29, the shield member 11 is assembled to the outer housing 13, and the shield member 11 is held by the outer housing 13.

An insertion hole 45 through which the outer terminal 9 is inserted is arranged on the shield member 11 side of the outer housing 13. At an opening edge on an inner side of the insertion hole 45, an anti-detachment portion 47 is arranged which engages with an outer surface of the outer terminal 9. The inner connection portion 17 of the inner terminal 5, the cylindrical portion 23 of the inner housing 7, and a part of the outer terminal 9 fitted to the mating outer terminal 109 are arranged inside the outer housing 13 in a state where the shield member 11 is assembled to the outer housing 13.

First, the shield member 11 is assembled to the outer housing 13 via each press-fit groove 29 and each rib 43. Next, the outer terminal 9 is inserted into the insertion hole 45 and the hole portion 31 of the shield member 11 from the anti-detachment portion 47 side of the insertion hole 45 until the outer terminal 9 engages with the anti-detachment portion 47 in a state before the locking portion 25 is bent. Next, the locking portion 25 of the outer terminal 9 is bent and the locking portion 25 is engaged with the opening edge of the hole portion 31. Next, the inner housing 7 holding the inner terminal 5 is housed in the shield member 11 such that the cylindrical portion 23 is housed in the outer terminal 9. The substrate connection portion 19 of the inner terminal 5 is electrically connected to the substrate 3, and the fixing portion 27 of the shield member 11 is fixed to the substrate 3. On the shield member 11 side of the outer housing 13, a regulating portion 49 is arranged which is arranged opposite to the engagement portion 33 of the shield member 11. The grounding member 15 is assembled to the engagement portion 33 of the shield member 11 before being assembled to the outer housing 13.

As illustrated in FIGS. 1 to 6 and 9, the grounding member 15 is made of a conductive material. The grounding member 15 includes a main body 51 and a contact portion 53.

The main body 51 extends in a plane direction parallel to the fitting direction of the mating connector 101 and the connector 1 to have a planar shape. The width of the main body 51 is set to be smaller than the width of the groove 35 of the engagement portion 33. The length of the main body 51 is set to be larger than the depth of the groove 35. The thickness of the main body 51 is set to be large than a distance between an upper surface of the groove 35 and a tip of each press-fit projection 37. Therefore, when the main body 51 is inserted into the groove 35, the main body 51 is press-fitted and fixed to the groove 35 by means of each press-fit projection 37. When the main body 51 is fixed to the groove 35, the grounding member 15 is held by the shield member 11 and the grounding member 15 is electrically connected to the shield member 11. Since the length of the main body 51 is larger than the depth of the groove 35, an end of the main body 51 opposite to the groove 35 is exposed to the outside of the shield member 11.

The contact portion 53 is formed of a single member continuous with the end of the main body 51 opposite to the groove 35. The contact portion 53 is arranged in an elastically deformable manner by bending a part of the main body 51 exposed from the groove 35 upward and bending the part so as to incline further. Therefore, when the main body 51 is fixed to the groove 35, the contact portion 53 is exposed to the outside the shield member 11 and is arranged in an elastically deformable manner above the shield member 11. The contact portion 53 is elastically contacted with a case as a grounding object when the connector 1 is housed in a metal case for housing the substrate 3, for example. Due to the contact portion 53 being contacted with the grounding object, the grounding member 15 is electrically connected to the grounding object. Therefore, the shield member 11 and the outer terminal 9 are grounded via the grounding member 15. A part of the contact portion 53 that is contacted with the grounding object is divided into two parts, but when the contact portion 53 is elastically deformed, stress is concentrated at one location in the main body 51.

In this way, the grounding member 15 has only one portion which is the contact portion 53 that is elastically deformable with respect to the main body 51. Therefore, since stress generated by the elastic deformation of the contact portion 53 is concentrated at only one location in the main body 51, it is not necessary to increase the size and strength by increasing the thickness of the main body 51. Further, due to the main body 51 engaging with the engagement portion 33 of the shield member 11 and the shield member 11 holding the grounding member 15, the electrical connection reliability between the shield member 11 and the grounding member 15 can be maintained.

In a state before the shield member 11 is assembled to the outer housing 13, the main body 51 is fixed to the groove 35 and this kind of grounding member 15 is assembled to the shield member 11. The shield member 11 to which the grounding member 15 is assembled is assembled to the outer housing 13. In a state where the shield member 11 is assembled to the outer housing 13, the regulating portion 49 of the outer housing 13 is arranged opposite to the grounding member 15 in a direction of separation of the main body 51 from the groove 35. When the grounding member 15 moves in the direction of separation from the groove 35, the regulating portion 49 abuts the grounding member 15 and regulates the movement of the grounding member 15. Therefore, the grounding member 15 does not separate from the groove 35, and the grounding member 15 can be stably held by the shield member 11.

When this kind of connector 1 is fitted to the mating connector 101, the mating outer housing 111 is fitted to the outer housing 13 such that the mating outer housing 111 is inserted into the outer housing 13. At this time, the inner terminal 5 is electrically connected to the mating inner terminal 105, and the device and the substrate 3 are electrically connected. Further, the outer terminal 9 is electrically connected to the mating outer terminal 109 and a shield circuit is formed.

This kind of connector 1 includes the shield member 11, the outer housing 13 as a housing to which the shield member 11 is assembled, and the grounding member 15 for grounding the shield member 11. Further, the grounding member 15 includes the main body 51 formed to have a planar shape, and the contact portion 53 which is formed of a single member continuous with the main body 51 in an elastically deformable manner and is in contact with the grounding object. The shield member 11 includes the engagement portion 33 which is engaged with the main body 51 and makes the shield member 11 hold the grounding member 15.

A part of the grounding member 15 that is elastically deformed with respect to the main body 51 is only the contact portion 53. Therefore, since stress generated by the elastic deformation of the contact portion 53 is concentrated at only one location in the main body 51, it is not necessary to increase the size and strength by increasing the thickness of the main body 51. Further, due to the main body 51 engaging with the engagement portion 33 of the shield member 11 and the shield member 11 holding the grounding member 15, the electrical connection reliability between the shield member 11 and the grounding member 15 can be maintained.

Therefore, in this kind of connector 1, it is possible to suppress an increase in the size and maintain the electrical connection reliability of the grounding member 15.

The engagement portion 33 has the groove 35 into which the main body 51 is inserted and the press-fit projections 37 that project in the groove 35 and press-fit the main body 51 into the groove 35.

Therefore, it is not necessary to arrange a hole portion or the like in the planar-shaped main body 51 and the strength of the main body 51 can be maintained.

A plurality of press-fit projections 37 are provided.

Therefore, the grounding member 15 can be stably held by the shield member 11, and the electrical connection reliability between the shield member 11 and the grounding member 15 can be stably maintained.

The outer housing 13 includes the regulating portion 49 arranged opposite to the grounding member 15 in the direction of separation of the main body 51 from the groove 35.

Therefore, the regulating portion 49 prevents the main body 51 from separating from the groove 35, and the grounding member 15 can be stably held by the shield member 11.

In the connector 1 according to the present embodiment, three press-fit projections 37 are arranged in the groove 35, but the present invention is not limited thereto. The number of press-fit projections 37 arranged in the groove 35 may be two or less or four or more, for example. In addition, press-fit projections may be provided which project in the groove 35 from an inner surface of either one of both side walls of the shield member 11 constituting the groove 35.

In the connector 1 according to the present embodiment, the engagement portion 33 is configured to have the groove 35 and the press-fit projections 37, but the present invention is not limited thereto. The engagement portion 33 may be constituted by a pair of holding pieces, for example. The planar-shaped main body 51 may be inserted between the pair of holding pieces, and the main body 51 may be held by the pair of holding pieces. Alternatively, notches may be arranged in both side surfaces of the planar-shaped main body 51 in the width direction. Meanwhile, the engagement portion 33 may be configured to have a groove and engagement projections which are arranged in the groove and engage with the notches. In this case, the size of each notch may be made as small as possible, and the number of the notches and the engagement projections may be more than one. In this way, the engagement portion 33 may have any form as long as the engagement portion 33 can engage with the main body 51.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A connector comprising:

a shield member;

a housing to which the shield member is assembled; and a grounding member configured to ground the shield member, wherein the grounding member includes:

a main body having a planar shape; and a contact portion formed of a single member continuous with the main body in an elastically deformable manner and configured to contact a grounding object, and the shield member includes an engagement portion configured to engage with the main body and hold the grounding member in the shield member.

2. The connector according to claim 1, wherein the engagement portion includes:

a groove into which the main body is inserted; and a press-fit projection projecting in the groove and configured to press-fit the main body into the groove.

3. The connector according to claim 2, wherein the press-fit projection is provided in plurality.

4. The connector according to claim 2, wherein the housing includes a regulating portion arranged opposite to the grounding member in a direction of separation of the main body from the groove.

* * * * *